(12) United States Patent
Srinivasan

(10) Patent No.: US 9,774,461 B2
(45) Date of Patent: Sep. 26, 2017

(54) NETWORK SWITCH WITH DYNAMIC MULTICAST QUEUES

(71) Applicant: Oracle International Corporation, Redwood Shores, CA (US)

(72) Inventor: Arvind Srinivasan, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 135 days.

(21) Appl. No.: 14/919,409

(22) Filed: Oct. 21, 2015

(65) Prior Publication Data

US 2017/0118033 A1   Apr. 27, 2017

(51) Int. Cl.
| | |
|---|---|
| *H04L 12/28* | (2006.01) |
| *H04L 12/18* | (2006.01) |
| *H04L 12/947* | (2013.01) |
| *H04L 12/24* | (2006.01) |
| *H04L 12/935* | (2013.01) |

(52) U.S. Cl.
CPC .......... *H04L 12/18* (2013.01); *H04L 41/0893* (2013.01); *H04L 49/25* (2013.01); *H04L 49/3045* (2013.01)

(58) Field of Classification Search
None
See application file for complete search history.

(56) References Cited

U.S. PATENT DOCUMENTS

| | | | |
|---|---|---|---|
| 2005/0063308 A1* | 3/2005 | Wise | H04L 47/39 370/236 |
| 2006/0251067 A1* | 11/2006 | DeSanti | H04L 29/12801 370/389 |
| 2008/0126564 A1* | 5/2008 | Wilkinson | H04L 12/64 709/242 |
| 2009/0003212 A1* | 1/2009 | Kwan | H04L 49/508 370/235 |
| 2016/0173365 A1 | 6/2016 | Srinivasan et al. | |
| 2016/0173401 A1 | 6/2016 | Srinivasan et al. | |

* cited by examiner

*Primary Examiner* — Minh-Trang Nguyen
(74) *Attorney, Agent, or Firm* — Park, Vaughan, Fleming & Dowler LLP

(57) ABSTRACT

A system for communicating a multicast packet through a network switch fabric is described. The system receives the multicast packet at an input port of the network switch fabric, where the multicast packet is directed to multiple output ports, and where the network switch fabric has a virtual output queue (VOQ)-based architecture, in which each input port maintains a separate VOQ for unicast packets to each output port and one or more VOQs for multicast packets destined to multiple output ports. The system sends the multicast packet by inserting the multicast packet into the one or more VOQs associated with the multiple output ports, so that multicast packets are queued separately from unicast packets. Moreover, the system may optionally dynamically modify a number of the one or more VOQs for the multicast packets based on a number of multicast flows through the network switch fabric.

16 Claims, 5 Drawing Sheets

NETWORK SWITCH WITH DYNAMIC MULTICAST QUEUES

BACKGROUND

Field

The present disclosure relates to techniques for queuing packets in a network switch. More specifically, the present disclosure relates to a network switch with separate virtual output queues for multicast and unicast traffic.

Related Art

High-performance computing systems often include large numbers of servers interconnected by a network switch fabric that is responsible for moving packets among the servers. Each of these servers can run multiple virtual machines (VMs) and associated virtualized applications, and the network packet streams generated by these servers are typically directed to different resources that the VMs and associated applications need to access. Hot spots and associated network congestion frequently arise in such network switch fabrics depending on the traffic patterns of the packet streams and how the switch fabric is configured.

'Multicast packets' (which are sometimes referred to as 'multi-destination packets' or, when all the output ports are addressed, 'broadcast packets'), which are sent from a single source to multiple destinations, are a major contributor to such network congestion. Whenever a multicast packet is sent across a network switch fabric, traffic multiplication occurs. For example, a multicast packet entering a switch port is typically replicated to all or a subset of the output ports. As the number of VMs in the network switch fabric increases, this replication greatly reduces the amount of bandwidth that is available to transfer other packets through the switch fabric, thereby adversely affecting the performance of other packet streams. In addition, sequential scheduling of packets to various output ports in the network switch fabric introduces head-of-line blocking.

Hence, what is needed is a technique for communicating a multicast packet through a network switch fabric without adversely affecting other packet streams.

SUMMARY

The disclosed embodiments relate to a system for communicating a multicast packet through a network switch fabric with input ports and output ports. During operation, the system receives a packet at an input port of the network switch fabric, wherein the packet is a unicast packet directed to an output port or a multicast packet that is directed to multiple output ports. Note that the network switch fabric has a virtual output queue (VOQ)-based architecture in which each input port maintains a separate unicast VOQ for each output port for unicast packets and one or more multicast VOQs for output ports for multicast packets so that multicast packets are queued separately from unicast packets. Then, the system sends the packet from the input port to the output port (for the unicast packet) or the output ports (for the multicast packet) by inserting the packet into a unicast VOQ for the output port or one or more of the multicast VOQs for the output ports.

Note that the number of the multicast VOQs may be fixed based on a policy of the network switch fabric. Alternatively, the number of the multicast VOQs may be dynamically modified based on a number of multicast flows through the network switch fabric.

In some embodiments, the network switch fabric includes an Infiniband™ switch.

Furthermore, while inserting the packet into a given VOQ, the packet may be assigned to a current virtual lane in multiple virtual lanes for a data flow associated with the packet. Additionally, prior to assigning the packet to the current virtual lane, the system may remap from a previous virtual lane specified by information in the packet to the current virtual lane. Note that the virtual lanes may be non-blocking and may have priorities associated with different data flows.

Moreover, priorities of the one or more multicast VOQs and the unicast VOQs may be based on unicast and multicast flows in a scheduler in the network switch fabric.

Another embodiment provides a computer-program product for use with the network switch fabric. This computer-program product includes instructions for at least some of the aforementioned operations performed by the system.

Another embodiment provides a method for communicating a packet through a network switch fabric with input ports and output ports, which may be performed by an embodiment of the system.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Overview

Figure 1:
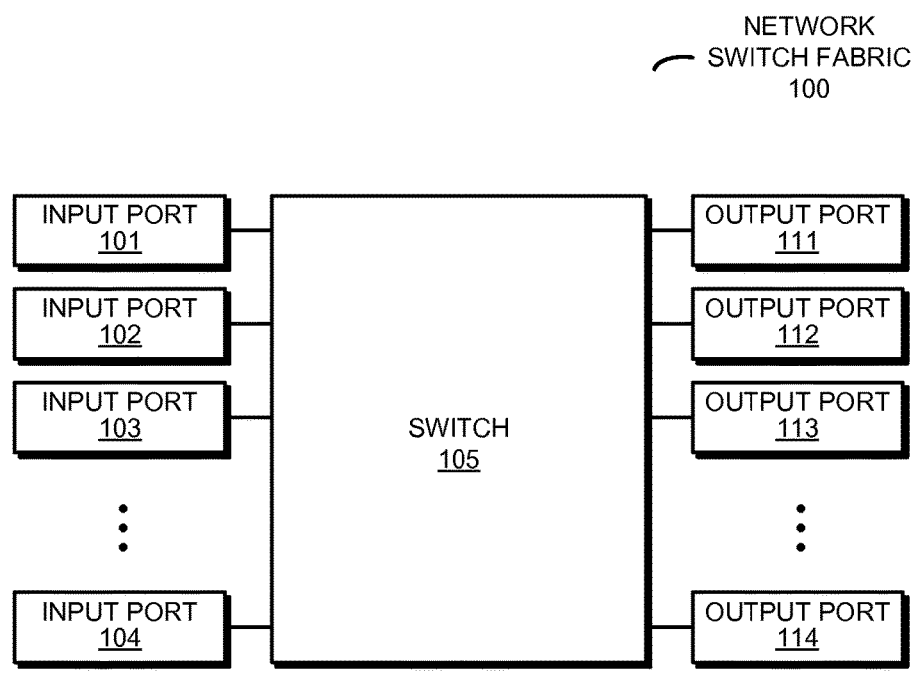
FIG. 1 is a block diagram illustrating a network switch fabric in accordance with an embodiment of the present disclosure.

In high-performance computing systems, a network switch fabric is commonly used to move packets between servers. With servers running multiple virtual machines (VMs) and associated virtualized applications, network packet streams from a server tend to be associated with a number of different services that each VM and its applications seek to access. Depending on the traffic patterns and how the switch fabric is configured, network congestion can arise at various locations in the network switch fabric.

As mentioned previously, multicast packets are a major contributor to network congestion. A multicast packet that enters an input port of a network switch fabric is replicated to a subset of or all of the output ports, which can cause over-subscription and associated congestion. In particular, the replication can reduce the effective bandwidth on the input by a factor that is a function of the number of times the packet replication occurs. Because of the way traffic fluctuates in a network, it is not possible to completely eliminate this performance problem. However, a number of techniques can be used to optimize the performance of a network switch fabric by, to some extent, avoiding blocking behavior between ports and packet types (such as unicast and multicast packets).

For example, the system can provide independent buffers, such as virtual output queues (VOQs), for multicast packets, which are pre-allocated to specific output ports. This does not actually solve the bandwidth problem, but it can facilitate non-blocking behavior between unicast packets and multicast packets. Also, because of the significant increase in the queue size associated with independent buffers, this technique effectively limits the total number of multicast packets that can be present in a switch at any point in time, which can reduce congestion. Moreover, this technique is typically used in Ethernet switches because packets can be dropped more easily than in Infiniband™ switches. In contrast, this technique does not work well for Infiniband™ switches, because packets cannot be dropped and the Infiniband™ protocol also relies on credit exchanges. Note that providing separate VOQs for multicast packets complicates the process of accounting for credits because the system needs to reserve credits for multicast packets only. This reduces the number of credits that are available for unicast packets, which impedes the flow of unicast packets through the switch.

Because the Infiniband™ protocol is credit-based, other techniques use sequential packet scheduling to solve some of the complexities introduced by the credit-management approach. For example, packets may be moved from one VOQ to another VOQ in a predetermined order. To a large extent, this technique simplifies buffer management and some of the intricacies associated with credit management. However, this technique introduces head-of-line blocking, in which a packet cannot be scheduled in the next VOQ until it moves out of the first VOQ, and so on. Such head-of-line blocking completely breaks the non-blocking nature of output ports in a VOQ-based architecture.

The disclosed embodiments address this problem using a network switch fabric with separate, dedicated VOQs (and, more generally, buffers) for unicast packets (with a VOQ for each output port in each input port in the network switch fabric) and one or more VOQs for multicast packets, which may be shared by one or more output ports. Furthermore, the number of multicast VOQs may be dynamically modified based on a number of multicast flows through the network switch fabric and/or the priorities of the multicast flows (and, more generally, in a way that increases or optimizes the performance of network switch fabric 100). In particular, the number of multicast VOQs may be determined using a 'first-come, first-serve' multicast-packet-scheduling technique based on quality-of-service (QoS). The QoS framework in the multicast-packet-scheduling technique allows a given output port to distinguish between a unicast packet and a multicast packet. Moreover, the given output port can distinguish between a unicast packet and a multicast packet at a flow granularity above and beyond the scope of what is defined by the Infiniband™ standard. For example, in Infiniband™, the QoS is provided based on service levels (SLs) that are mapped to virtual lanes (VLs). Depending on the deployment scenario and the available hardware, there can be 16 SLs and up to 15 VLs. In this way, multicast packets may be queued separately from unicast packets and head-of-line blocking can be avoided.

Note that a given VOQ is typically tied to one output only and there are usually as many VOQs are the number of output ports. These VOQs reside on the input side of the network switch fabric. In the discussion that follows, a multicast queue or VOQ behaves like a traditional VOQ except that it may be tied to multiple outputs simultaneously. Physically it may reside on the input side just like a traditional VOQ.

Before describing the multicast-packet-scheduling technique further, we first describe the structure of the network switch fabric.

Network Switch Fabric

FIG. 1 presents a block diagram of an exemplary network switch fabric 100 in accordance with the disclosed embodiments. Network switch fabric 100 includes a switch 105, which can be used to send packets between a number of input ports 101-104 and a number of output ports 111-114. Network switch fabric 100 is used to send packets between various components within a system (such as system 500 in FIG. 5), including but not limited to servers, memories, storage devices and external interfaces.

Switch 105 can generally include any type of switch that can be used to send packets from input ports 101-104 to output ports 111-114. For example, switch 105 can comprise a crossbar switch that can be configured to simultaneously send packets from each input to each possible output. Alternatively, switch 105 can comprise a multi-stage switch having multiple stages of switching elements. Moreover, note that network switch fabric 100 can generally include any number of input ports and any number of output ports. In an exemplary embodiment, network switch fabric 100 includes 42 input ports and 42 output ports.

Figure 2:
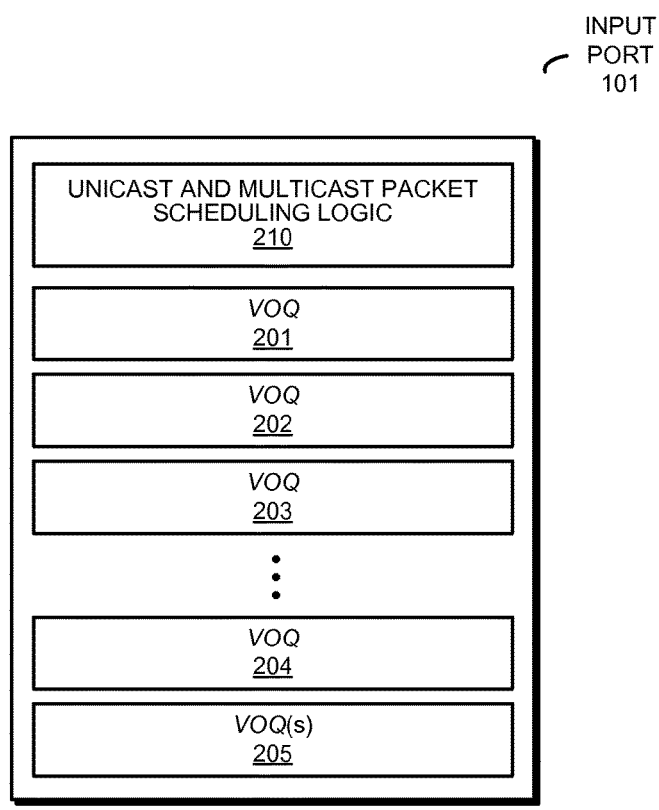
FIG. 2 is a block diagram illustrating an input port in the network switch fabric of FIG. 1 in accordance with an embodiment of the present disclosure.

Network switch fabric 100 has a virtual output queue (VOQ) architecture, in which each input port maintains a separate unicast VOQ for each output port and one or more multicast VOQs that are shared by one or more of the output ports. For example, FIG. 2 presents a block diagram of an exemplary input port 101 for network switch fabric 100 in accordance with the disclosed embodiments. Note that input port 101 maintains a number of VOQs 201-204 for unicast packets, wherein each VOQ 201-204 is associated with a different output port. In addition, input port 101 maintains one or more VOQ(s) 205 for multicast packets, wherein each of VOQ(s) 205 is associated with one or more output ports. In this way, the queuing of unicast packets at the input ports 101-104 is separate from the queuing of multicast packets.

Input port 101 also includes unicast and multicast packet scheduling logic 210 (which may be implemented in hardware and/or software), which is responsible for scheduling unicast and multicast packets to be inserted into VOQ(s). During this scheduling process, unicast and multicast packet scheduling logic 210 may dynamically determine or modify the number of VOQ(s) 205 based on the number of multicast flows and their associated priorities. However, in some embodiments the number of VOQs 205 is fixed based on a policy of network switch fabric 100. Furthermore, because the VL specified in an incoming packet from a previous network switch fabric (in the case of multiple hops in a system) may not be supported in network switch fabric 100, unicast and multicast packet scheduling logic 210 may also remap this packet to a different VL in network switch fabric

100. The multicast-packet-scheduling technique is described in more detail below with reference to FIGS. 3 and 4.

Virtual Output Queue

Figure 3:
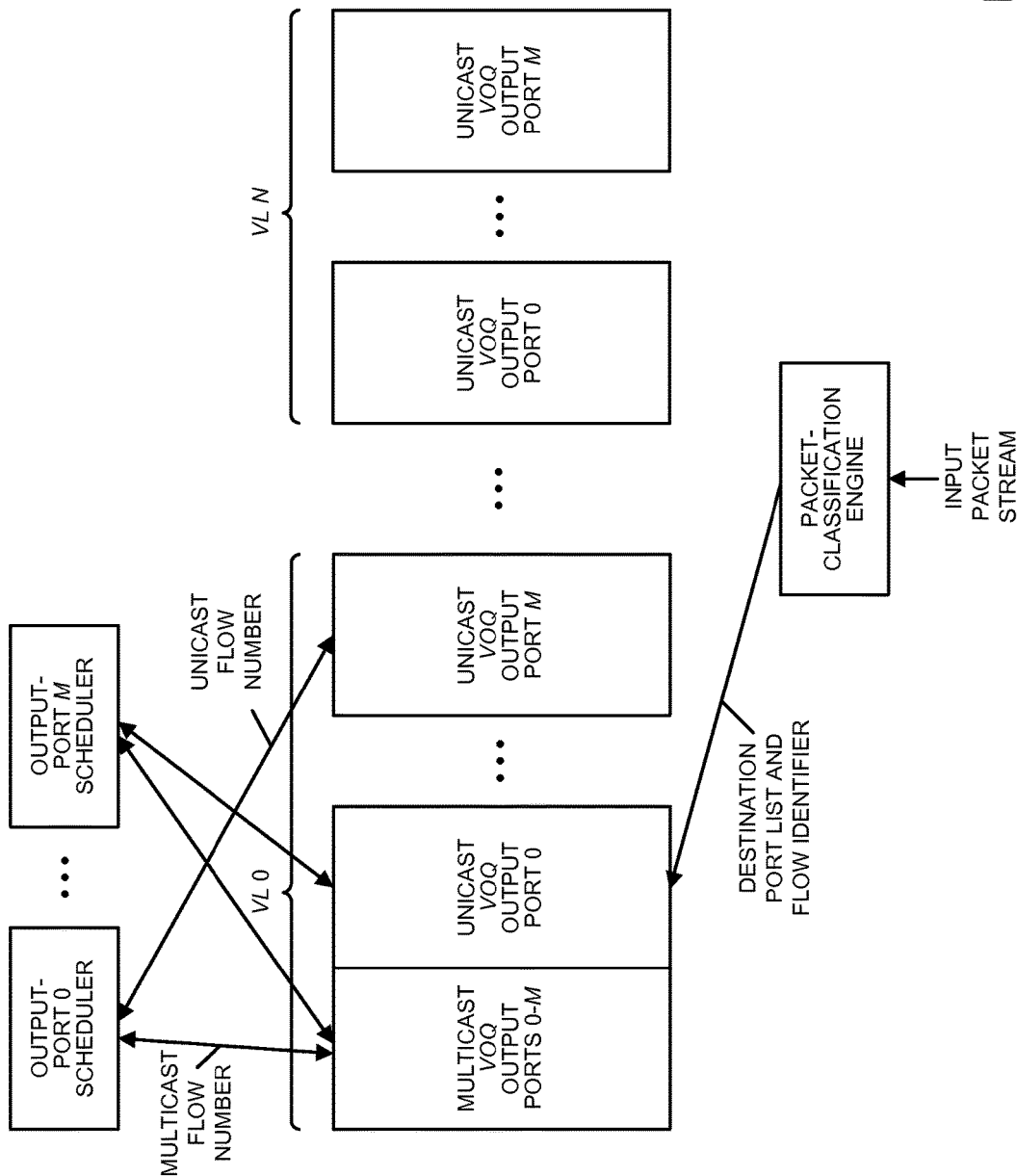
FIG. 3 is a block diagram illustrating virtual lanes (VLs) in a virtual output queue (VOQ) in the network switch fabric of FIG. 1 in accordance with an embodiment of the present disclosure.

FIG. 3 presents source VLs in VOQ 201 within an input port 101 in accordance with the disclosed embodiments. This VL-based VOQ queuing architecture may provide independent buffering for flow-specific purposes without violating protocol and application-specific packet ordering rules (such as credit flows, packet drops, etc.). As described previously, having independent pre-allocated buffering on the input side for only multicast packets typically usually does not work well. The principle used here is to have independent, dynamic buffering as a "virtual-output-like" mechanism that can have proprietary rules for QoS. One or more flows can be bound to this VL-based VOQ queuing architecture. Note that unlike a VOQ that is tied to only one output port, one or more output ports can be tied to the VL-based VOQ queue architecture shown in FIG. 3. Moreover, the output ports tied to this queue may be considered as a 'set' within which the output ports are served on a first-come, first-serve basis. In general, there can be more than one such VL-based VOQ queue present for each input-port queue (that may eventually map to a given source VL).

The VL-based VOQ queuing architecture may be selected based on a packet-classification engine (such as control logic or a program module in network switch fabric 100) that determines the destination ports and destination VLs. Moreover, the packet-classification engine may be based on the look up of the tables, and the flow type (e.g., SL, destination-level identifier or DLID, service-level identifier or SLID, etc.) determines the queue identifier where the packets need to be queued. In general, there may not be restrictions on what packet type goes into which queue. However, all packets of a given flow may be sent into the same queue. This may guarantee packet ordering within a given flow.

Furthermore, all multicast packets may be queued into one or more special multicast queues. The output side that is responsible for QoS may schedule the one or more multicast queues based on its policies. In particular, as described further below, the scheduling for a particular packet may be based on a port list and a port ordering. Note that the input port may schedule the output port on a first-come, first-serve basis rather than in a sequential manner. This may be dictated by a switching-arbitration technique and, thus, may be more efficient.

Additionally, the output side may be responsible for maintaining QoS requirements. With the introduction of the one or more multicast queues, the unicast and multicast packet scheduling logic 210 may need to provide QoS between multicast flows and unicast flows. Based on application-specific needs, both these flows may yet map to the same VL, but there may be more fine-grain control with a given VL.

Note that a current port list may be maintained for each packet by control logic in the network switch fabric (such as in unicast and multicast packet scheduling logic 210). This current port list may be updated as the packets are moved out to a given destination port. In particular, as packets are received from the network at an input port and are classified, the packet-classification engine may generate an initial port list that specifies a set of destinations for the packet. For example, the port list may include a bit vector having a bit for each output port. A bit that is set in the port list may indicate that a packet still needs to be inserted into a VOQ for an output port associated with the bit. Moreover, the port list may be used to keep track of which VOQs a packet still needs to visit.

The port list may be maintained along with the packet as it gets queued into the VL-based VOQ. As the packet is read from the VOQ (based on the output/input scheduling technique) and sent to an output port, the corresponding bit may be cleared from the port list. If the resulting port list is all 0s (which may indicate that a packet has been sent to all of its destinations), then the packet may be marked for deletion from the VOQ and the buffers may be freed. This freeing-up process may result in credits being released on the source VL of the packet. However, if the resulting port list is not all 0s (which may indicate that some destinations are still remaining), the packet may remain in the queue until the remaining output ports schedule the given input port.

Note that the determination of a port ordering (with a list of output ports arranged in a specific order, where, as described further below, the specific order can be updated based on various policies) for input port 101 for packet replication may be driven by the output ports and the switch-scheduling technique. The switch-scheduling technique may guarantee fairness and may prevent starvation. Because there is no sequential queuing of packets in the preceding technique, there may not be blocking between ports for multicast packets.

The ordering specified in the port ordering or the port-order list can be determined based on a number of different policies, such as: a congestion-based ordering policy, a fullness-based ordering policy, and/or a static ordering policy.

For example, a congestion-based ordering policy can be implemented as follows. When a multicast packet moves into the head of each VOQ, a timer may be started, and the timer may be stopped and reset whenever that packet moves to the output port. This timer may keep track of how long the packet has been at the head of the queue waiting for the output to be scheduled. (Note that if the timer value crosses a certain preset threshold, this could indicate potential congestion at the output port.) The congestion-based ordering technique may sort the current timer values for the VOQs from low to high, and then may load up the port-order list with corresponding port numbers. In this way, the least-congested ports may be at the top of the port order list and the most-congested ports may be at the bottom of the port-order list.

A fullness-based ordering policy can be implemented as follows. As a packet moves into each VOQ, a counter may be incremented. Similarly, when a packet is moved out of a VOQ, the counter may be decremented. This counter represents the buffer occupancy for the VOQ. Moreover, the sum of all VOQ buffer occupancies to a given output port may represent the total buffer occupancy for the output port. A fullness-based ordering technique can operate by sorting the buffer occupancy values for the VOQs from low to high and then loading up the port-order list with the corresponding port numbers. In this way, the least-occupied ports may be at the top of the port-order list and the most-occupied ports may be at the bottom of the port-order list. In both of the above-described techniques, the relative ordering among ports may change dynamically as the traffic profile of the network changes, or as the behavior of each output port changes.

Furthermore, a static ordering policy can be implemented by simply loading up the port-order list using a static policy that does not change over time. For example, an ordering of the output ports can be determined based on the speed of the output ports. In this case, higher-speed output ports that provide 100 G of bandwidth may be ordered first ahead of lower-speed output ports that provide 10 G or 1 G of bandwidth.

Processing Unicast and Multicast packets

Figure 4:
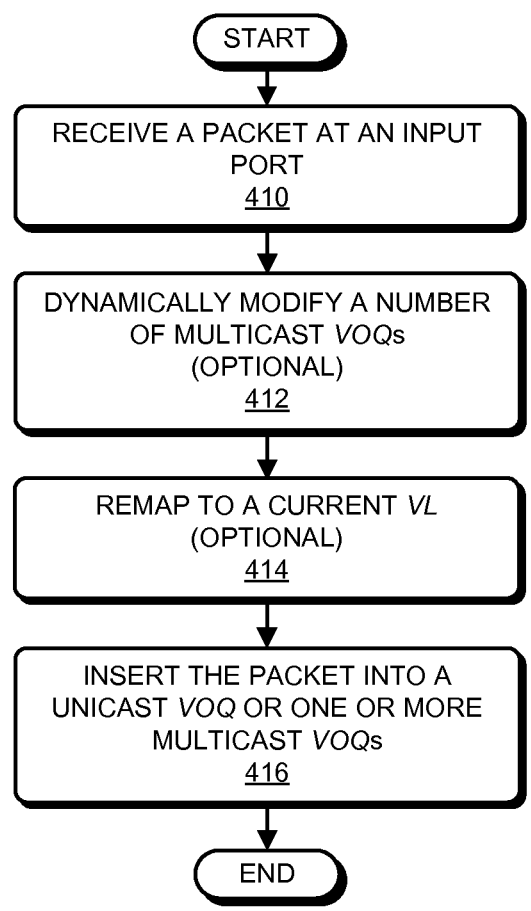
FIG. 4 is a flow chart illustrating a method for communicating a packet through a network switch fabric with input ports and output ports in accordance with an embodiment of the present disclosure.
Figure 5:
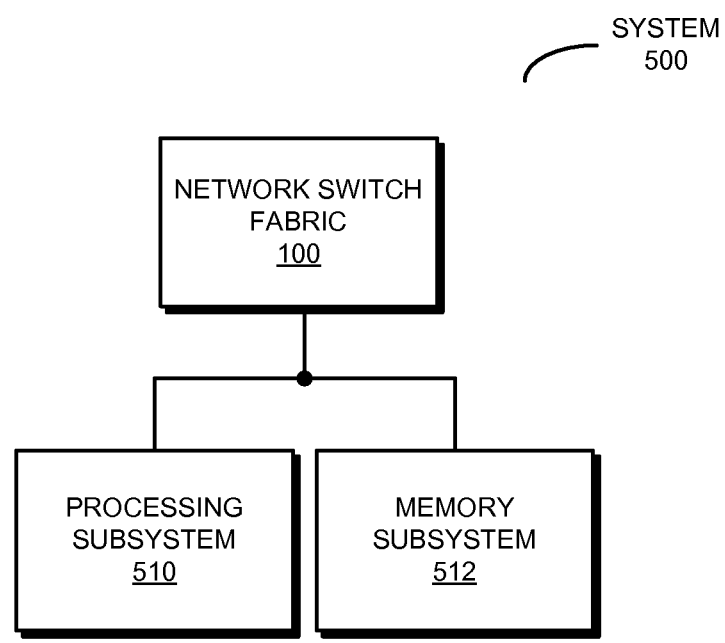
FIG. 5 is a block diagram illustrating a computer system in accordance with an embodiment of the present disclosure.

FIG. 4 presents a flow chart illustrating a method 400 for communicating a packet through a network switch fabric with input ports and output ports, which may be performed by a system (such as system 500 in FIG. 5). During operation, the system receives a packet at an input port (operation 410) of the network switch fabric, where the packet is a unicast packet directed to an output port or a multicast packet that is directed to multiple output ports. Note that the network switch fabric has a virtual output queue (VOQ)-based architecture in which each input port maintains a separate unicast VOQ for each output port for unicast packets and one or more multicast VOQs for output ports for multicast packets so that multicast packets are queued separately from unicast packets. In some embodiments, the network switch fabric includes an Infiniband™ switch.

Moreover, a number of the multicast VOQs may be fixed based on a policy of the network switch fabric. Alternatively, the system may optionally dynamically modify the number of the multicast VOQs (operation 412) based on a number of multicast flows through the network switch fabric.

Then, the system sends the packet from the input port to the output port (for the unicast packet) or the output ports (for the multicast packet) by inserting the packet into a unicast VOQ for the output port or one or more of the multicast VOQs for the output ports (operation 416).

Furthermore, while inserting the packet into a given VOQ, the packet may be assigned to a current VL in multiple VLs for a data flow associated with the packet. Additionally, prior to assigning the packet to the current VL, the system may optionally remap from a previous VL specified by information in the packet to the current VL (operation 414). Note that the VLs may be non-blocking and may have priorities associated with different data flows.

Moreover, priorities of the one or more multicast VOQs and the unicast VOQs may be based on unicast and multicast flows in a scheduler in the network switch fabric.

In some embodiments of method 400, there may be additional or fewer operations. Moreover, the order of the operations may be changed, and/or two or more operations may be combined into a single operation.

In an exemplary embodiment, an Infiniband™ network switch fabric has I input ports, J output ports and 15 VLs supported. This network switch fabric has 15·J unicast VOQs and K multicast VOQs, where, in general, K is different than (and much less than) 15·J. As shown in FIG. 3, instead of queuing per source VL, in the K multicast VOQs there may be one or more VLs tied to multiple output ports. Moreover, the K multicast VOQs may support up to 16,384 multicast flows. Note that FIG. 3 the multicast VOQ is only shown for VL 0. Similar, multicast VOQs exist for all the VLs. As noted previously, a given VL is related to a source VL (as specified in arriving packets). However, the VL may remapped to a different VL while egressing.

In another example, an Infiniband™ network switch fabric has I input ports, J output ports and 15 VLs supported. The total number of unicast VOQs on each of the I input ports may be 15·J. Each VL is non-blocking and at the same time each output is non-blocking as well. From an input buffer stand point, there may be less than or equal to 15 of them (one per supported VL). Given the SL-to-VL-type mapping that is possible, input/source VLs can be remapped to different destination VLs. Therefore, any of the 15·J unicast VOQs can reside on any of the 15 source VL queues.

As described previously, the number of VOQs may be extended to 15·J plus K (which may include up to 15·K VOQs), and additional QoS parameters may be used in the scheduling. In particular, multicast packets may be scheduled for these K multicast queues based on packet-header look up, policies, etc. In principle, this approach can be used for other packet types (i.e., it may not be just for multicast packets).

The total space for multicast flows is 16,384. The value of K may be less than 15·J. Otherwise, it will be same as having independent buffers, which may defeat the purpose completely. In general, the 16,384 spaces may be mapped into QoS K buckets (for example based on hashing or some other policy).

The network switch fabric may be included in a system, such as a computer system. This is shown in FIG. 5, which presents a block diagram illustrating a system 500 that includes network switch fabric 100. In some embodiments, system 500 includes processing subsystem 510 (with one or more processors) and memory subsystem 512 (with memory).

In general, functions of network switch fabric 100 and system 500 may be implemented in hardware and/or in software. Thus, system 500 may include one or more program modules or sets of instructions stored in a memory subsystem 512 (such as DRAM or another type of volatile or non-volatile computer-readable memory), which, during operation, may be executed by processing subsystem 510. Note that the one or more computer programs may constitute a computer-program mechanism. Furthermore, instructions in the various modules in memory subsystem 512 may be implemented in: a high-level procedural language, an object-oriented programming language, and/or in an assembly or machine language. Note that the programming language may be compiled or interpreted, e.g., configurable or configured, to be executed by the processing subsystem.

Components in system 500 may be coupled by signal lines, links or buses. These connections may include electrical, optical, or electro-optical communication of signals and/or data. Furthermore, in the preceding embodiments, some components are shown directly connected to one another, while others are shown connected via intermediate components. In each instance, the method of interconnection, or 'coupling,' establishes some desired communication between two or more circuit nodes, or terminals. Such coupling may often be accomplished using a number of circuit configurations, as will be understood by those of skill in the art; for example, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 500 may be at one location or may be distributed over multiple, geographically dispersed locations.

System 500 may include: a VLSI circuit, a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device. Note that a given computer system may be at one location or may be distributed over multiple, geographically dispersed locations.

Furthermore, the embodiments of network switch fabric 100 and/or system 500 may include fewer components or additional components. Although these embodiments are illustrated as having a number of discrete items, these components are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of network switch fabric 100 and/or system 500 may be implemented more in hardware and less in software, or less in hardware and more in software, as is known in the art.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A method for communicating a packet through a network switch fabric with input ports and output ports, wherein the method comprises:

receiving the packet at an input port of the network switch fabric, wherein the packet is one of a unicast packet directed to an output port and a multicast packet that is directed to multiple output ports, and wherein the network switch fabric has a virtual output queue (VOQ)-based architecture in which each input port maintains a separate unicast VOQ for each output port for unicast packets and one or more multicast VOQs for output ports for multicast packets so that multicast packets are queued separately from unicast packets; and sending the packet from the input port to one of the output port and the output ports by inserting the packet into one of a unicast VOQ for the output port and one or more of the multicast VOQs for the output ports, wherein, while inserting the packet into a given VOQ, the packet is assigned to a current virtual lane in multiple virtual lanes for a data flow associated with the packet, and prior to assigning the packet to the current virtual lane, remapping from a previous virtual lane specified by information in the packet to the current virtual lane.

2. The method of claim 1, wherein a number of the multicast VOQs is fixed based on a policy of the network switch fabric.

3. The method of claim 1, wherein a number of the multicast VOQs is dynamically modified based on a number of multicast flows through the network switch fabric.

4. The method of claim 1, wherein the network switch fabric includes an Infiniband™ switch.

5. The method of claim 1, wherein the virtual lanes are non-blocking and have priorities associated with different data flows.

6. The method of claim 1, wherein priorities of the one or more multicast VOQs and the unicast VOQs are based on unicast and multicast flows in a scheduler in the network switch fabric.

7. A computer-program product for use in conjunction with a network switch fabric having input ports and output ports, the computer-program product comprising a non-transitory computer-readable storage medium and a computer-program mechanism embedded therein to facilitate communication of a packet through the network switch fabric, the computer-program mechanism including:

instructions for receiving the packet at an input port of the network switch fabric, wherein the packet is one of a unicast packet directed to an output port and a multicast packet that is directed to multiple output ports, and wherein the network switch fabric has a virtual output queue (VOQ)-based architecture in which each input port maintains a separate unicast VOQ for each output port for unicast packets and one or more multicast VOQs for output ports for multicast packets so that multicast packets are queued separately from unicast packets; and instructions for sending the packet from the input port to one of the output port and the output ports by inserting the packet into one of a unicast VOQ for the output port and one or more of the multicast VOQs for the output ports, wherein while inserting the packet into a given VOQ, the packet is assigned to a current virtual lane in multiple virtual lanes for a data flow associated with the packet, and wherein the virtual lanes are non-blocking and have priorities associated with different data flows.

8. The computer-program product of claim 7, wherein a number of the multicast VOQs is fixed based on a policy of the network switch fabric.

9. The computer-program product of claim 7, wherein a number of the multicast VOQs is dynamically modified based on a number of multicast flows through the network switch fabric.

10. The computer-program product of claim 7, wherein the network switch fabric includes an Infiniband™ switch.

11. The computer-program product of claim 7, wherein the computer-program mechanism includes instructions for, prior to assigning the packet to the current virtual lane, remapping from a previous virtual lane specified by information in the packet to the current virtual lane.

12. The computer-program product of claim 7, wherein priorities of the one or more multicast VOQs and the unicast VOQs are based on unicast and multicast flows in a scheduler in the network switch fabric.

13. A computer system that communicates a packet, comprising:
- a network switch fabric with input ports and output ports, wherein the packet is one of a unicast packet directed to an output port and a multicast packet that is directed to multiple output ports; and
- wherein the network switch fabric has a virtual output queue (VOQ)-based architecture in which each input port maintains a separate unicast VOQ for each output port for unicast packets and one or more multicast VOQs for output ports for multicast packets so that multicast packets are queued separately from unicast packets; and
- wherein, during operation, the network switch fabric:
  - receives the packet at an input port of the network switch fabric; and
  - sends the packet from the input port to one of the output port and the output ports by inserting the packet into one of a unicast VOQ for the output port and one or more of the multicast VOQs for the output ports wherein,
    - while inserting the packet into a given VOQ, the packet is assigned to a current virtual lane in multiple virtual lanes for a data flow associated with the packet, and
    - prior to assigning the packet to the current virtual lane, remapping from a previous virtual lane specified by information in the packet to the current virtual lane.

14. The computer system of claim 13, wherein a number of the multicast VOQs is fixed based on a policy of the network switch fabric.

15. The computer system of claim 13, wherein, during operation, a number of the multicast VOQs is dynamically modified based on a number of multicast flows through the network switch fabric.

16. The computer system of claim 13, wherein priorities of the one or more multicast VOQs and the unicast VOQs are based on unicast and multicast flows in a scheduler in the network switch fabric.

* * * * *

UNITED STATES PATENT AND TRADEMARK OFFICE
CERTIFICATE OF CORRECTION

PATENT NO. : 9,774,461 B2
APPLICATION NO. : 14/919409
DATED : September 26, 2017
INVENTOR(S) : Srinivasan It is certified that error appears in the above-identified patent and that said Letters Patent is hereby corrected as shown below:

In the Specification

In Column 1, Line 63, delete "he" and insert -- be --, therefor.

In Column 6, Line 14, delete "Os" and insert -- 0s --, therefor.

In the Claims

In Column 12, Line 2, in Claim 13, delete "ports" and insert -- ports, --, therefor.

Signed and Sealed this
Twenty-fourth Day of July, 2018

Andrei Iancu
*Director of the United States Patent and Trademark Office*